2,772,981
PAPER COATING COMPOSITION

William F. Smart, Sayreville, N. J., assignor to National Starch Products Inc., New York, N. Y., a corporation of Delaware No Drawing. Application March 17, 1953,
Serial No. 342,977

5 Claims. (Cl. 106—203)

This invention relates to a paper-coating composition.

The prime object of this invention is to provide an improved composition for coating paper. One of the objects is to provide coating compositions characterized by improved stability of the composition against viscosity breakdown as a result of high shear. Other objects include the attainment of improved flexibility, calendering, water retention, adhesive power and flow characteristics in paper coating compositions.

In order to improve the appearance and printing characteristics of paper, it is often coated with compositions containing pigments and other components whose functions will be set forth in greater detail below. The coating may be accomplished as an integral part of the paper-making process, coating the paper web while it is still in the paper-making machine (i. e., on-the-machine coating) or the coating composition may be applied to paper subsequently, as a separate operation (i. e., off-the-machine coating).

Paper-coating compositions ordinarily consist of an aqueous suspension of a pigment such as a suitable grade of clay, calcium carbonate, blanc fixe, titanium dioxide or such other pigment as may be required. This portion of the coating composition is referred to in the trade as the "pigment slip." It is customary to add to the pigment slip another component, to act as an adhesive. Thus, casein, animal glue, zein and starch are used as adhesives for this purpose, starch (or its modifications) being the most widely used. The function of the adhesive component in a coating composition is to bind the pigment particles to one another and to the paper stock, to give desirable flow characteristics to the coating composition and to control the absorption of printing ink during the printing of the coated sheet.

In paper coating operations, and particularly where on-the-machine coating is involved, tremendously high shear forces are exerted upon the coating composition as it passes through the various rollers. This shear often results in a change of the viscosity of the coating composition, with the result that it loses its thixotropic character, and as it is coated on to the paper it is unable to retain sufficient water, which is instead immediately absorbed into the paper. This in turn means that the mass of coating material as it is applied to the paper quickly changes in flow properties because of the water loss, and therefore cannot level off to the even, continuous film that is required. This poor leveling characteristic in turn thus results in "patterning," which is the term given to uneven coating.

In order to improve the stability of paper coating compositions and to help them retain their thixotropic character in spite of the high shears involved in machine application, it has been suggested to add various materials to the compositions. Such additives include soap, gelatin and alginates. While these materials do effect some improvement in the viscosity-stability of the coating composition in some cases, this improvement is ordinarily not sufficient to overcome the serious difficulties which will result from viscosity breakdown, loss of thixotropic character, poor water retention and patterning.

I have now discovered a new additive for paper coating compositions which causes such compositions to become remarkably resistant to viscosity breakdown and loss of thixotropic character under high shear conditions. This material is hemicellulose. Hemicellulose is a carbohydrate material occurring in the cell walls of plants in conjunction with cellulose and lignin. Thus, it may be obtained from many plant sources, including, for example, wood, oat hulls, corn bran, corn cobs and other agricultural residues. The hemicellulose is ordinarily obtained from these source materials by extraction with aqueous alkaline solution. The particular method of extraction of the hemicellulose, and the particular source from which it may be obtained, does not affect its value for the purposes of this invention. As will be noted from the examples shown subsequently in this specification, I have employed hemicellulose from various sources as an additive to paper coating formulation with equal success.

Although I have found that hemicellulose may completely replace the adhesive component in paper coatings, I ordinarily prefer to add it to the paper coating composition, retaining also the usual adhesive component (i. e. starch, dextrine, casein, etc.).

I have found that the most notable improvements in the properties of the paper coating are obtained when the hemicellulose is employed as an additive, in the proportion of 0.4% and up, based on the dry weight of the adhesive component. When used to replace the adhesive component, the preferred quantity of hemicellulose would be approximately two-thirds the weight of the adhesive material which would ordinarily be used in that formula. For example, two parts by weight of hemicellulose is equal to three parts of oxidized starch as a pigment adhesive.

The problem of breakdown of viscosity due to shear is encountered mainly in machine coating (also referred to as roll coating). But even in off-the-machine coating, such as for example in brush and knife coating of paper, hemicellulose has been proved to be an excellent additive. In brush coating, the composition must be of a thin, paint-like consistency. However, this very thinness ordinarily permits excessive penetration of water into the paper, resulting in patterning. The presence of hemicellulose notably improves the water retention of the coating, cutting down water penetration into the paper. Thus the flow and adhesive properties of the coating are substantially improved.

Another marked advantage of paper coating compositions containing hemicellulose is found in the subsequent printing on the paper, particularly in heat-set letterpress ink work. The hemicellulose results in a lessened tendency toward penetration of the ink and this in turn results in improved density and uniformity of the printed surfaces.

When casein is used as the adhesive component of a paper coating, the question of pH value is very important when considering possible additives. Hemicellulose has the additional advantage that the pH range of hemicellulose solutions makes them compatible with casein formulations. Generally, offset coatings made with casein require an additive to maintain the proper moisture content, and hemicellulose is excellent for this purpose. The grease resistance of casein coatings is also notably improved by the use of hemicellulose as a coating additive.

The following examples will further illustrate the embodiment of my invention.

EXAMPLE I

This example illustrates a machine coating composition containing 5% hemicellulose based on the adhesive (dextrine). In this and in the subsequent examples all parts given are by weight.

3000 parts coating grade clay were dispersed in 942 parts of water containing 3.6 parts sodium hexa-meta phosphate as a dispersing agent. This suspension constituted the "pigment slip."

Separately, 450 parts of corn dextrine were cooked in 840 parts water for 15 minutes at 190° F., and enough water then added to bring to 1430 parts. This adhesive mix was then added to the pigment slip.

150 grams of a 10% soap solution in water were then added, and the entire formulation kneaded for ½ hour in commercial sigma blade mixing equipment. The function of the soap was to add to the thixotropic properties of the coating. The resultant mix is referred to as the coating "color."

To 1600 parts of the above coating color there were added 80 parts of a solution of 6.5 parts hemicellulose (extracted from corn bran) in 73.5 parts water.

The final coating color was adjusted by the addition of water so as to have 60% solids.

The above formulation was evaluated to determine the stabilizing effect of the hemicellulose additive on viscosity measured at high rates of shear. The equipment used was the Hercules Hi-Shear Viscosimeter as described in the article by J. Smith and Paul D. Applegate, Paper Trade Journal, 126, No. 23: 60–66 (June 3, 1948). Two formulations, one made as above described, and the other as above but without the addition of the hemicellulose solution, were subjected in the viscosimeter for a period of one minute at a rate of shear of 4540 sec.$^{-1}$ allowed to stand for 5 minutes, and a standard rheogram was prepared.

A value called the "leveling index" is used to indicate the ratio of the coefficient of thixotropic breakdown to the plastic viscosity, and it is generally accepted as an indication of the patterning characteristics of a coating composition. A low index number indicates permanent breakdown in plastic viscosity as a result of shear. The formulation containing no hemicellulose had a leveling index of 0.154. The formulation containing the hemicellulose had a leveling index of 0.208—a significant improvement in stability, in view of the relatively long period of high shear to which the material had been subjected.

EXAMPLE II

This example illustrates a machine coating composition wherein the adhesive is an enzyme converted starch, and wherein a comparison is made between an additive comprising 0.4% of soap, based on the starch, and 0.4% of hemicellulose, based on the starch. It also illustrates the use of hemicellulose from various sources.

Adhesive cook 26 parts of pearl cornstarch were converted and cooked in 74 parts of water, with .02 part amylitic enzyme, under controlled time-temperature conditions, to make the pigment adhesive.

Pigment slip 26 parts of coating grade clay were mixed with 10 parts water containing .05 part sodium pyrophosphate as a dispersant.

Coating color

Two coating colors were made from the above preparation, each comprising 47 parts pigment slip
7 parts adhesive cook
0.04 part additive solution In one case, the additive solution consisted of an aqueous soap solution containing 20% solids. In the other case, the additive was a 20% aqueous dispersion of hemicellulose (derived from corn bran).

Both materials were coated on paper by means of a planographic roll coater, the coatings being applied under the same conditions of shear (differential roll speeds).

It was found that the composition containing hemicellulose was of considerably lower viscosity than that ordinarily considered feasible for machine coating compositions. In such prior compositions the initial viscosity was deliberately brought much higher, in order to compensate for the subsequent breakdown due to shear, and to provide the required viscosity at the point of application. In my composition, however, the viscosity at the point of application was substantially the same as that of the original coating composition, and it had excellent flow properties. It permitted the application of a considerably heavier coating, with increased pick test and less patterning, as compared to the composition using soap as the additive.

The above hemicellulose example was repeated, using identical ingredients, proportions and procedures, except that the hemicellulose used was a type derived from birch wood in one case, from oat hulls in another case, and from corn cobs in the third. In all three cases the superiority of the composition containing hemicellulose as the additive was notable, and comparable to that described above.

EXAMPLE III

This example illustrates a coating composition wherein hemicellulose was used as the sole adhesive.

A pigment slip was prepared by dispersing 300 parts coating grade clay in 123 parts water containing 0.4 part sodium hexa-meta phosphate as dispersant.

To 200 parts of this pigment slip were added 60 parts of an aqueous dispersion of hemicellulose, containing 23% solids.

Because hemicellulose has excellent adhesive properties in itself, it acts as an excellent pigment binder in coating compositions and therefore when applied as a paper coating, the above mixture was found to be highly satisfactory.

EXAMPLE IV

This example illustrates the preparation of a brush coating composition, containing 6.8% of hemicellulose, based on the adhesive. It will be noted that brush coating compositions generally require considerably lower solids than do machine coating compositions.

A pigment slip was prepared by dispersing in 250 parts of water, 250 parts of a coating grade clay-calcium carbonate mixture containing approximately 15% calcium carbonate.

An adhesive cook was prepared by cooking 59 parts of corn dextrine in 134 parts water for 15 minutes at 190° F.

The pigment slip and adhesive cook were mixed, and there was added 20 parts of an aqueous dispersion of hemicellulose containing 20% solids.

The high water retention properties of this material, when applied as a coating are due to the addition of the hemicellulose. The hemicellulose, by helping to retain the water in the coating, controls the penetration of adhesive into the paper stock and thus results in increased adhesive value within the coating itself.

EXAMPLE V

This example illustrates the preparation of a coating containing 3.5% hemicellulose, based on the adhesive, and containing a mixture of casein and dextrine as the adhesive.

A pigment slip was prepared by dispersing 120 parts coating grade clay in 80 parts water, using a small quantity of a standard dispersant.

An adhesive cook was prepared by heating a mixture of 35 parts water, 25 parts casein, 64 parts of a 40% aqueous dispersion of white corn dextrine and 4 parts ammonium hydroxide for one hour at 200° F.

The adhesive cook and pigment slip were then mixed and 9 parts of an aqueous solution of hemicellulose containing 20% solids were added.

The resulting coating composition when applied to paper was characterized by excellent properties of water retention, improved varnishability and grease resistance.

EXAMPLE VI

This example illustrates the preparation of a size press-coating composition using hemicellulose as the sole adhesive, in a quantity greater than that of the pigment.

A pigment slip was prepared by dispersing 50 parts of coating grade clay in 350 parts water, with the aid of a small quantity of a dispersing agent. This was mixed with a dispersion of 100 parts hemicellulose in 400 parts water.

As previously mentioned, the function of the adhesive component in a coating composition is primarily that of a pigment binder. Hemicellulose performs the same function, together with the added property of improved water retention, thus permitting better control of penetration in the final coating.

It will be clear that the proportion of hemicellulose to be employed cannot be set down in terms of absolute figures. Thus, it can be used, to advantage, as an additive in conjunction with other adhesives such as starch, dextrine and the like, in proportions of as little as 0.4% based on the dry weight of the adhesive. On the other hand, since it has good adhesive characteristics itself, it can be used in any desired proportions in relation to other adhesives, and may even be used as the sole adhesive, as illustrated in Examples III and VI. The important fact is that this invention teaches for the first time the use of added hemicellulose in paper coating formulations and the most notable improvement thus achieved is the resultant stability against viscosity breakdown of the formulation. Other advantages, such as improved water retention and flow characteristics are also of real industrial importance.

I claim:

1. A paper-coating composition comprising a paper coating pigment slip having an additive consisting of hemicellulose.

2. A paper-coating composition comprising a paper coating pigment slip, an adhesive selected from the group consisting of casein, animal glue, zein, starch and dextrine, and an additive consisting of hemicellulose.

3. A paper-coating composition comprising a paper coating pigment slip having an additive consisting of hemicellulose, said hemicellulose having been obtained from plant sources by extraction with aqueous alkaline solutions.

4. A paper-coating composition comprising a paper coating pigment slip, an adhesive selected from the group consisting of casein, animal glue, zein, starch and dextrine, and an additive consisting of hemicellulose, said hemicellulose having been obtained from plant sources by extraction with aqueous alkaline solutions.

5. The paper-coating composition of claim 1 in which the paper coating pigment slip is an aqueous suspension and in which the hemicellulose is in an aqueous solution.

References Cited in the file of this patent

UNITED STATES PATENTS

| | | |
|---|---|---|
| 118,177 | Allen | Aug. 22, 1871 |
| 185,669 | Cashin | Dec. 26, 1876 |
| 922,822 | Stewart | May 25, 1909 |
| 1,863,731 | Schorger | June 21, 1932 |
| 1,917,181 | Ackermann | July 4, 1933 |
| 2,549,822 | Koonce | Apr. 24, 1951 |